United States Patent
Geisberger et al.

(10) Patent No.: US 9,829,406 B2
(45) Date of Patent: Nov. 28, 2017

(54) DIFFERENTIAL CAPACITIVE OUTPUT PRESSURE SENSOR AND METHOD

(71) Applicant: FREESCALE SEMICONDUCTOR, INC., Austin, TX (US)

(72) Inventors: Aaron A Geisberger, Austin, TX (US); Dubravka Bilic, Scottsdale, AZ (US); Chad S Dawson, Queen Creek, AZ (US); Fengyuan Li, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 100 days.

(21) Appl. No.: 14/854,648

(22) Filed: Sep. 15, 2015

(65) Prior Publication Data

US 2017/0074738 A1 Mar. 16, 2017

(51) Int. Cl.
*G01L 9/00* (2006.01)
*G01L 9/12* (2006.01)

(52) U.S. Cl.
CPC .................. *G01L 9/0073* (2013.01)

(58) Field of Classification Search
CPC . G01L 9/12; G01L 9/00; G01L 9/0073; G01L 19/00
See application file for complete search history.

(56) References Cited

U.S. PATENT DOCUMENTS

| 4,387,601 A * | 6/1983 | Azegami | G01D 5/2417 324/607 |
| 4,996,627 A * | 2/1991 | Zias | G01L 9/0073 205/656 |
| 6,528,340 B2 | 3/2003 | Haji-Sheikh et al. | |
| 2002/0194919 A1 * | 12/2002 | Lee | G01L 9/0073 73/718 |
| 2013/0118265 A1 * | 5/2013 | Besling | G01L 9/0042 73/724 |
| 2014/0060169 A1 | 3/2014 | Mcneil et al. | |

FOREIGN PATENT DOCUMENTS

| KR | 20020093491 A * | 12/2002 | G01L 9/0042 |
| WO | EP 2896946 A1 * | 7/2015 | F02M 26/47 |

* cited by examiner

*Primary Examiner* — Nguyen Ha (57) ABSTRACT

A differential capacitive output pressure sensor device includes a pressure sensor diaphragm layer comprising a pressure sensing diaphragm portion, a movable electrode on the pressure sensing diaphragm portion, a fixed electrode, and a device layer electrode. The pressure sensor device further includes a device layer including a fixed element connected to the device layer electrode and a movable element connected to the movable electrode. As the pressure changes, the pressure sensing diaphragm portion including the movable electrode and the movable element move. This changes the capacitance between the movable electrode and the fixed element inversely to the change in capacitance between the fixed electrode and the moveable element. Accordingly, a differential capacitive output is provided that has improved linearity with respect to the pressure change and increased sensitivity allowing the change in pressure to be measured readily and accurately.

15 Claims, 11 Drawing Sheets

DIFFERENTIAL CAPACITIVE OUTPUT PRESSURE SENSOR AND METHOD

FIELD

This disclosure relates generally to sensor devices, and more specifically, to capacitive pressure sensors and methods associated therewith.

BACKGROUND

Micro-Electro-Mechanical-System (MEMS) devices include MEMS pressure sensors. A MEMS pressure sensor measures pressure, e.g., by measuring movement of a pressure sensing diaphragm.

As the pressure sensing diaphragm moves, a change in capacitance between the pressure sensing diaphragm and a fixed electrode is measured. This change is capacitance is used to calculate the pressure.

The change in capacitance is single-ended, i.e., is a single change in capacitance between the pressure sensing diaphragm and the fixed electrode. This single-ended change in capacitance is non-linear with respect to the pressure change and has limited sensitivity in cases where the MEMS pressure sensor has limited sensing area. Accordingly, it is difficult to accurately measure the pressure.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 3:
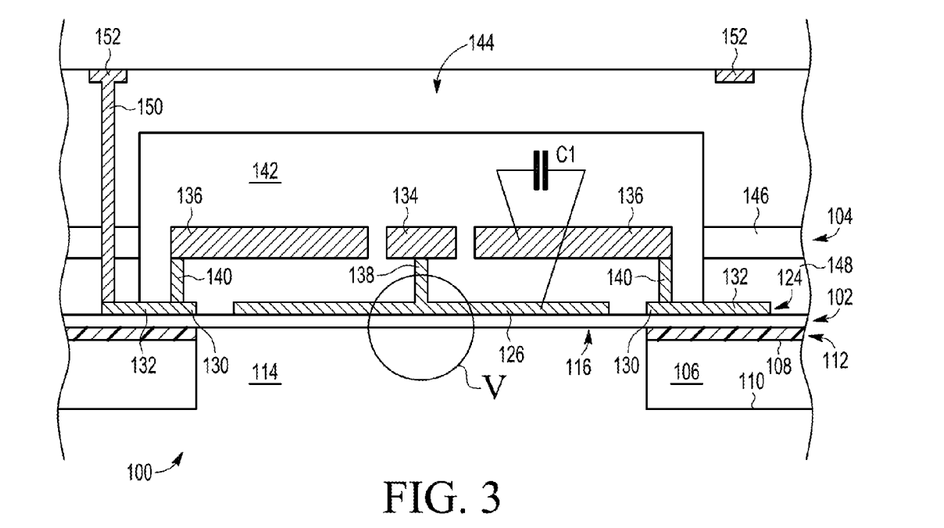
FIG. 3 is a cross-sectional view of the differential capacitive output pressure sensor device along the line III-III of FIG. 2 in accordance with one embodiment.
Figure 4:
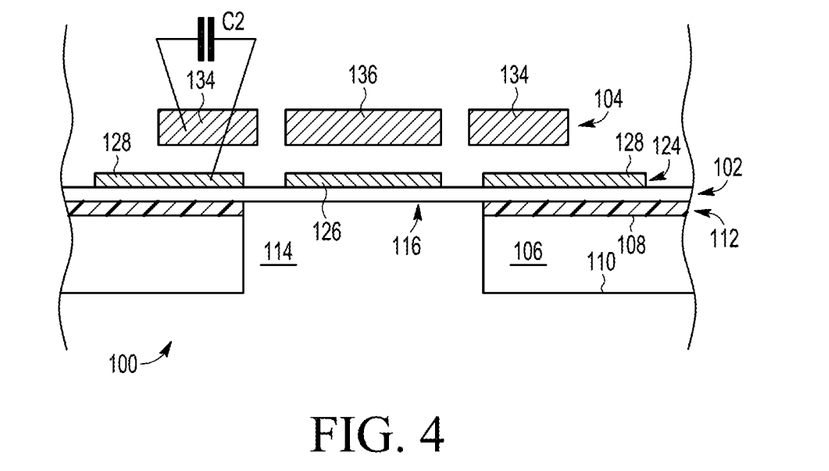
FIG. 4 is a cross-sectional view of the differential capacitive output pressure sensor device along the line IV-IV of FIG. 2 in accordance with one embodiment.

Referring to FIGS. 3-4, 6-7 together, a differential capacitive output pressure sensor device 100 includes an electrode layer 124 that is patterned into a moveable middle electrode 126 (FIGS. 3, 4) on a pressure sensing diaphragm portion 116 and a fixed electrode 128 (FIG. 4). Using these different electrodes 126, 128 and a connection to moveable elements 134 of a device layer 104, it is possible to provide a differential capacitive output, e.g., C1-C2 in FIG. 3-4 or C3-C4 in FIGS. 6-7. The differential capacitive output is more linear with respect to the pressure change than the capacitance change of either capacitor singly due to the cancelation of non-linear output from either capacitor singly. Further, by providing two sense capacitors, sensitivity is increased as compared to a single capacitor. Consequently, the change in pressure is measured readily and accurately.

Figure 1:
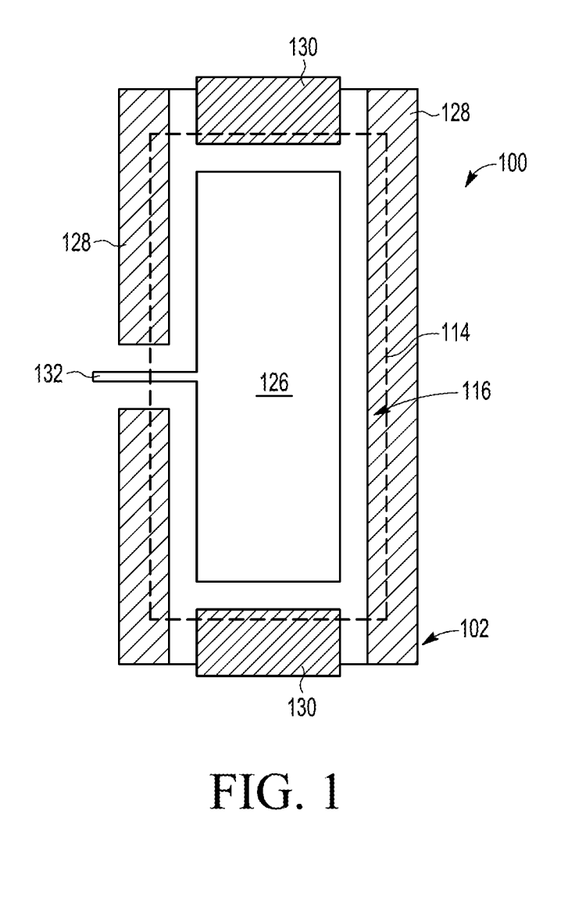
FIG. 1 is a top plan view of a pressure sensing diaphragm layer of a differential capacitive output pressure sensor device in accordance with one embodiment.
Figure 2:
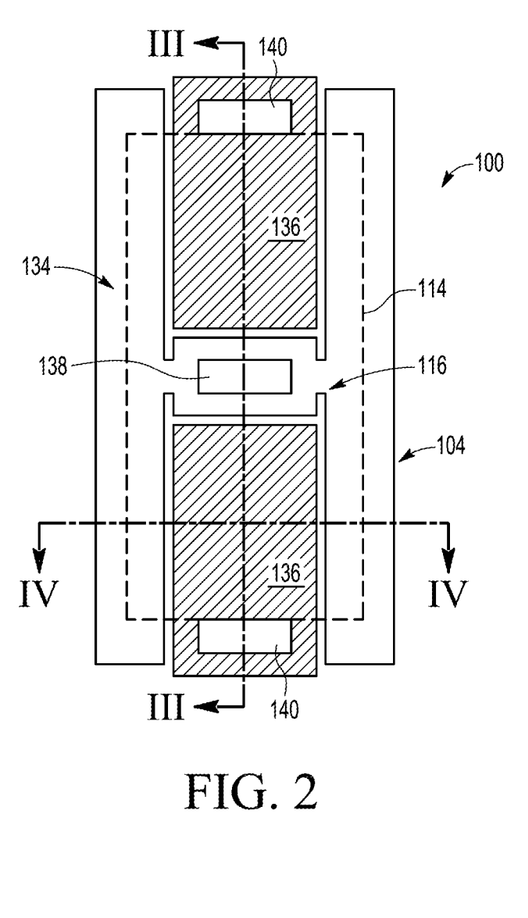
FIG. 2 is a top plan view of a device layer of the differential capacitive output pressure sensor device of FIG. 1 in accordance with one embodiment.

Now in more detail, FIG. 1 is a top plan view of a pressure sensing diaphragm layer 102 of a differential capacitive output pressure sensor device 100 in accordance with one embodiment. FIG. 2 is a top plan view of a device layer 104 of differential capacitive output pressure sensor device 100 of FIG. 1 in accordance with one embodiment. FIG. 3 is a cross-sectional view of differential capacitive output pressure sensor device 100 along the line III-III of FIG. 2 in accordance with one embodiment. FIG. 4 is a cross-sectional view of differential capacitive output pressure sensor device 100 along the line IV-IV of FIG. 2 in accordance with one embodiment. Differential capacitive output pressure sensor device 100 is sometimes called a Micro-Electro-Mechanical-System (MEMS) pressure sensor 100.

Referring now to FIGS. 1-4, differential capacitive output pressure sensor device 100 includes a substrate 106 having an upper, e.g., first, surface 108 and a lower, e.g., second, surface 110 opposite upper surface 108. Substrate 106, sometimes called a handle wafer, is formed of a semiconductor material including monocrystalline (single crystal) silicon although is formed of other materials in other embodiments.

Located on upper surface 108 is a substrate insulation layer 112. In one embodiment, substrate insulation layer 112 is formed of silicon oxide although is formed of other dielectric materials in other embodiments.

Located on substrate insulation layer 112 is pressure sensing diaphragm layer 102. A pressure sensor port 114 extends through substrate 106 and substrate insulation layer 112 to expose a pressure sensing diaphragm portion 116 of pressure sensing diaphragm layer 102. Pressure sensing diaphragm portion 116 is the pressure sensing diaphragm of differential capacitive output pressure sensor device 100 in accordance with this embodiment. The outline of pressure sensing diaphragm portion 116 corresponding to pressure sensor port 114 is illustrated by the dashed rectangle in the view of FIGS. 1-2 for purposes of illustration although it is to be understood that pressure sensor port 114 would not be visible in the view of FIGS. 1-2.

Figure 5:
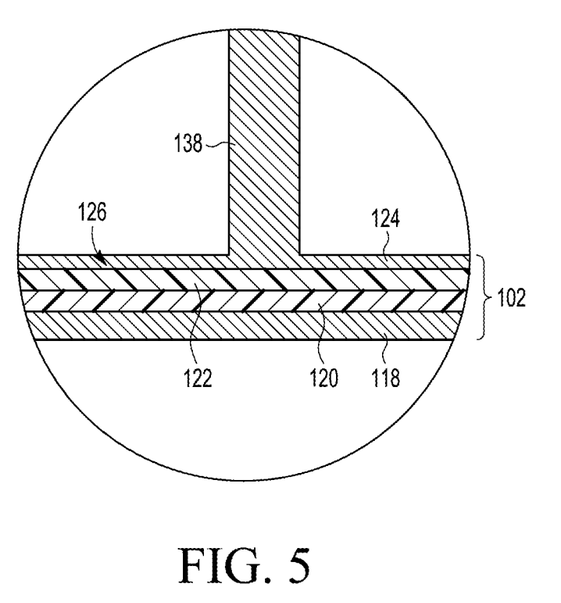
FIG. 5 is an enlarged cross-sectional view of a region V of the differential capacitive output pressure sensor device of FIG. 3 in accordance with one embodiment.

FIG. 5 is an enlarged cross-sectional view of a region V of differential capacitive output pressure sensor device 100 of FIG. 3 in accordance with one embodiment. FIG. 5 illustrates the structural layers of pressure sensing diaphragm layer 102 in accordance with this embodiment.

Paying particular attention now to FIGS. 1, 3-5 together, pressure sensing diaphragm layer 102 is a composite membrane and includes a conductive shield plane layer 118, a first dielectric layer 120, a second dielectric layer 122, and a conductive electrode layer 124 (a moveable middle electrode 126 of electrode layer 124, e.g., a portion thereof, is illustrated in FIG. 5). Illustratively, shield plane and electrode layers 118, 124 are formed of electrically conductive polysilicon. First dielectric layer 120 is silicon oxide, sometimes called a field oxide.

Second dielectric layer 122 is silicon nitride.

In one particular embodiment, the thickness of layers 118, 120, 122, 124 is 2 µm, 2 µm, 0.33 µm, and 0.3 µm, respectively, for a total thickness of 4.6 µm of pressure sensing diaphragm layer 102. Although particular materials and thicknesses are provide for pressure sensing diaphragm layer 102, in other embodiments, pressure sensing diaphragm layer 102 is formed using other material and/or other thicknesses.

In one embodiment, shield plane layer 118 is a shield plane, e.g., an unpatterned electrically conductive polysilicon layer that is electrically connected to a reference voltage source, e.g., ground, during operation. Electrode layer 124 is an electrically conductive layer that is patterned into one or more electrodes and traces as discussed further below. Dielectric layers 120, 122 electrically isolate electrode layer 124 from shield plane layer 118. In one embodiment, dielectric layers 120, 122 include openings for selective electrical connection of one or more conductors of electrode layer 124 with shield plane layer 118.

In accordance with this embodiment, electrode layer 124 is patterned into a movable middle electrode 126, a fixed electrode 128, a device layer electrode 130, and one or more traces 132. Stated another way, movable middle electrode 126, fixed electrode 128, device layer electrode 130, and one or more traces 132 are parts of electrode layer 124.

Movable middle electrode 126 is located on pressure sensor diaphragm portion 116. Accordingly, movable middle electrode 126 moves along with pressure sensor diaphragm portion 116 as the ambient pressure changes. Movable middle electrode 126 is sometime called a movable electrode 126.

Fixed electrode 128 is located directly adjacent pressure sensor diaphragm portion 116 and thus is fixed in position. Similarly, device layer electrode 130 is also located directly adjacent pressure sensor diaphragm portion 116 and thus is fixed in position. Traces 132 are electrically connected to one or more of movable middle electrode 126, fixed electrode 128, and device layer electrode 130. Traces 132 propagate signals to and/or from moveable middle electrode 126, fixed electrode 128, and device layer electrode 130 and associated electrically connected structures of device layer 104 during operation.

In accordance with this embodiment, device layer 104, e.g., 25 µm thick electrically conductive single crystal silicon (SCS), includes one or more movable elements 134 and one or more fixed elements 136. Movable element 134 is physically and electrically connected to movable middle electrode 126 by one or more movable element vias 138. Similarly, fixed elements 136 are physically and electrically connected to device layer electrodes 130 by one or more fixed element vias 140. Movable element via 138 and fixed element vias 140 are shown in the view of FIG. 2 for purposes of illustration although it is to be understood that vias 138, 140 would ordinarily not be visible in the view FIG. 2.

Movable element 134 and fixed elements 136 are located within a cavity 142 defined by a capping layer 144, e.g., including silicon. Capping layer 144 seals, sometimes called caps, cavity 142 thus isolating cavity 142 from the ambient environment. In accordance with this embodiment, capping layer 144 is a multilayer structure, e.g., including a portion 146 of device layer 104 and a remaining portion 148 of a sacrificial layer, e.g., of silicon oxide, that is removed to free elements 134, 136. Capping layer 144 is provided in any one of a number of different configurations in other embodiments, and the particular configuration illustrated and discussed is for purposes of illustration, and is not limiting. Capping layer 144 is not illustrated except in FIG. 3 for purposes of simplicity although, in light of this disclosure, those of skill in the art will understand that the various movable and fixed elements of the device layer are enclosed within a cavity defined by a capping layer in the other embodiments.

One or more electrically conductive capping layer vias 150 are electrically isolated from, but extend through, capping layer 144. Generally, capping layer vias 150 electrically connect traces 132 to external terminals 152 of differential capacitive output pressure sensor device 100. Although a particular electrically conductive pathway between traces 132 and terminals 152 is illustrated and discussed for simplicity, in other embodiments, other electrical routing is used depending upon the particular application.

As illustrated in FIG. 3, a first capacitance C1 exists between movable middle electrode 126 and fixed elements 136. As illustrated in FIG. 4, a second capacitance C2 exists between fixed electrode 128 and movable element 134.

Figure 6:
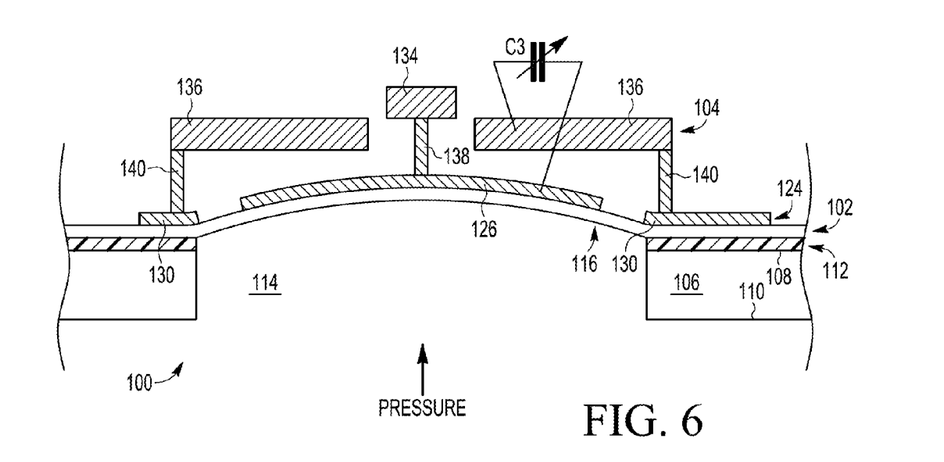
FIG. 6 is a cross-sectional view of the differential capacitive output pressure sensor device along the line III-III of FIG. 2 during operation in accordance with one embodiment.
Figure 7:
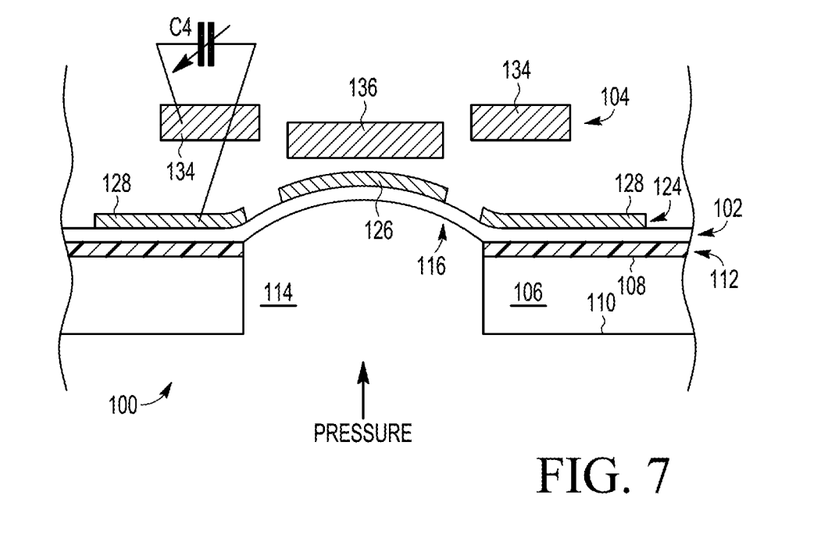
FIG. 7 is a cross-sectional view of the differential capacitive output pressure sensor device along the line IV-V of FIG. 2 during operation in accordance with one embodiment.

FIG. 6 is a cross-sectional view of differential capacitive output pressure sensor device 100 along the line III-III of FIG. 2 during operation in accordance with one embodiment. FIG. 7 is a cross-sectional view of differential capacitive output pressure sensor device 100 along the line IV-IV of FIG. 2 during operation in accordance with one embodiment. FIGS. 6 and 7 correspond to the view of FIGS. 3 and 4 except that pressure sensor diaphragm portion 116 of pressure sensing diaphragm layer 102 has been displaced towards fixed elements 136 due to application of pressure to pressure sensor diaphragm portion 116.

More particularly, during operation, changes in pressure in the ambient environment move pressure sensing diaphragm portion 116. Movement of pressure sensing diaphragm portion 116 changes the distance between pressure sensing diaphragm portion 116 and fixed elements 136, e.g., increases or decreases the distance. As the distance between pressure sensing diaphragm portion 116 and fixed elements 136 changes, the first and second capacitances C1, C2 between movable middle electrode 126 and fixed elements 136 and between fixed electrode 128 and movable element 134 changes. Thus, this change in capacitance correlates with the ambient pressure within pressure sensor port 114.

More particularly, referring to FIGS. 3 and 6 together, as the pressure increases, pressure sensing diaphragm portion 116 moves towards fixed elements 136 as illustrated in FIG. 6. This decreases the spacing between movable middle electrode 126 and fixed elements 136 thus increasing the capacitance from the first capacitance C1 (FIG. 3) to a third capacitance C3 (FIG. 6).

Further note that as movable middle electrode 126 moves towards fixed elements 136, movable element 134 also moves upward in the view of FIG. 6 to have less overlap with fixed elements 136. As the overlap between movable element 134 and fixed elements 136 is reduced, the capacitance between movable element 134 and fixed elements 136 is also reduced. However, the increase in capacitance between movable middle electrode 126 and fixed elements 136 is greater than the decrease in capacitance between movable element 134 and fixed elements 136 such that the overall capacitance increases, as described above.

At the same time, referring to FIGS. 4 and 7 together, as the pressure increases, pressure sensing diaphragm portion 116 moves towards fixed elements 136 as illustrated in FIG. 7. This moves movable middle electrode 126, movable element via 138 (see FIG. 6) and movable element 134 as a physically connected single unit upward and away from fixed electrode 128. Accordingly, the spacing between movable element 134 and fixed electrode 128 increases. This decreases the capacitance from the second capacitance C2 (FIG. 4) to a fourth capacitance C4 (FIG. 7).

Accordingly, as the pressure increases, a first increasing capacitance change from the first capacitance C1 to the third capacitance C3 occurs and a second decreasing capacitance change from the second capacitance C2 to the fourth capacitance C4 occurs. Conversely, as the pressure decreases, a first decreasing capacitance change from the third capacitance C3 to the first capacitance C1 occurs and a second increasing capacitance change from the fourth capacitance C4 to the second capacitance C2 occurs. The pressure at any point in time is measured using the differential capacitive output, e.g., C1-C2 at the pressure in FIG. 3-4 or C3-C4 at the pressure in FIGS. 6-7. The differential capacitive output is more linear with respect to the pressure change than the capacitance change of either capacitor singly due to the cancelation of non-linear output from either capacitor singly. Further, by providing two sense capacitors, sensitivity is increased as compared to a single capacitor. Consequently, the change in pressure is measured readily and accurately.

Differential capacitive output pressure sensor device 100 is formed using any one of a number of techniques as those of skill in the art will understand in light of this disclosure. For example, referring to FIG. 3, a sacrificial layer is formed and patterned on device layer 104. Electrode layer 124 is formed and patterned on the sacrificial layer and portions of electrode layer 124 extend into openings in the sacrificial layer, which will remain as vias 138, 140. Dielectric layers 122, 120 are formed and patterned on electrode layer 124. Shield plane layer 118 is formed on dielectric layer 120, 122. Substrate insulation layer 112 and substrate 106 are formed on shield plane layer 118.

Device layer 104 is then etched to define the various elements of device layer 104. The underlying sacrificial layer is then etched to release the various elements of device layer 104 while selectively leaving vias 138, 140. Capping layer 144 is mounted. The order of operations is simply illustrative and the operations are performed in a different order and/or additional and/or less operation are performed in other embodiments.

Figure 8:
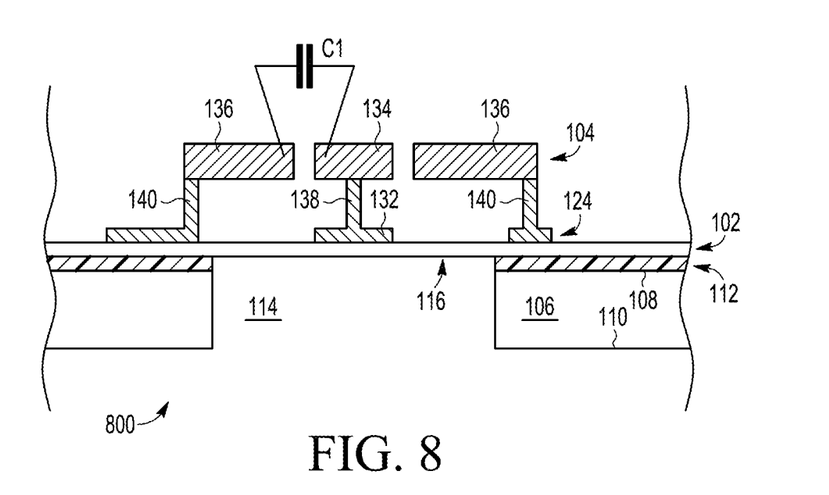
FIG. 8 is a cross-sectional view of a capacitive pressure sensor device in accordance with another embodiment.
Figure 9:
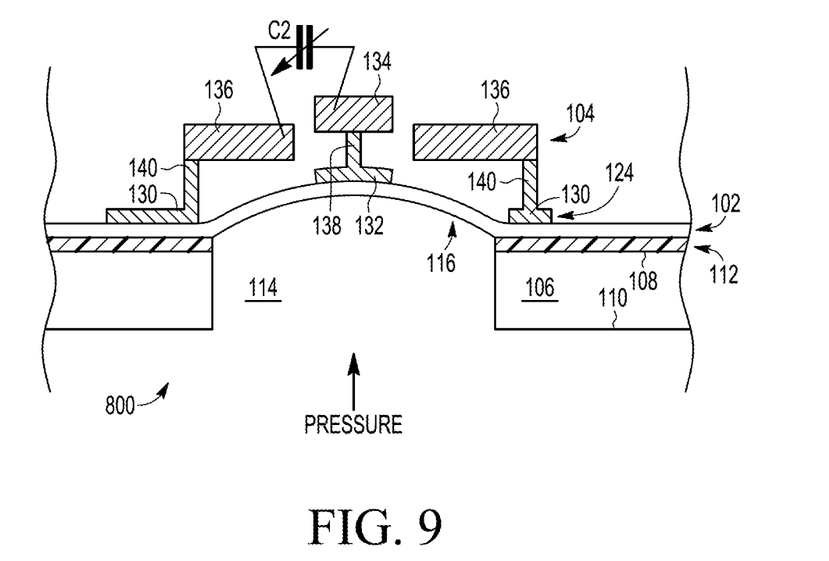
FIG. 9 is a cross-sectional view of the capacitive pressure sensor device of FIG. 8 during operation in accordance with one embodiment.

FIG. 8 is a cross-sectional view of capacitive pressure sensor device 800 in accordance with another embodiment. FIG. 9 is a cross-sectional view of capacitive pressure sensor device 800 of FIG. 8 during operation in accordance with one embodiment. Capacitive pressure sensor device 800 of FIGS. 8 and 9 is similar to differential capacitive output pressure sensor device 100 of FIGS. 3 and 6 with the primary exception being that capacitive pressure sensor device 800 does not include a movable middle electrode 126 or fixed electrodes 128 of differential capacitive output pressure sensor device 100 and provides a single-ended capacitive output.

As illustrated in FIG. 8, a first capacitance C1 exists between movable element 134 and fixed elements 136. Movable element 134 is physically connected to pressure sensing diaphragm portion 116, e.g., traces 132, by movable element via 138. As the pressure increases, pressure sensing diaphragm portion 116 moves towards fixed elements 136 as illustrated in FIG. 9. This moves movable element 134 upward to have less overlap with fixed elements 136. Accordingly, the overlap between movable element 134 and fixed elements 136 is reduced. This decreases the capacitance from the first capacitance C1 (FIG. 8) to a second capacitance C2 (FIG. 9). Second capacitance C2 is less than first capacitance C1. By measuring the change in capacitance, the pressure is measured.

Figure 10:
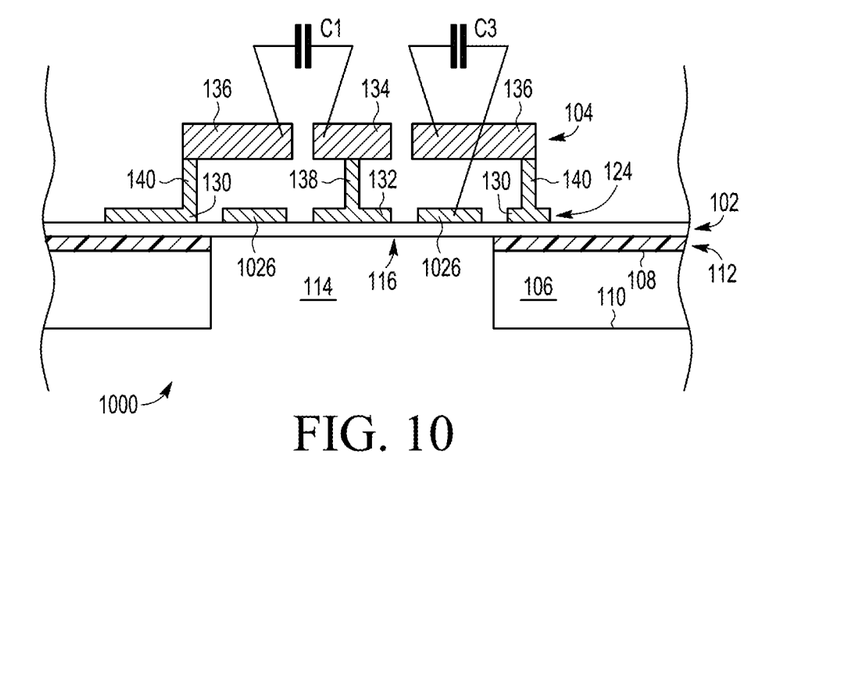
FIG. 10 is a cross-sectional view of a differential capacitive output pressure sensor device in accordance with another embodiment.
Figure 11:
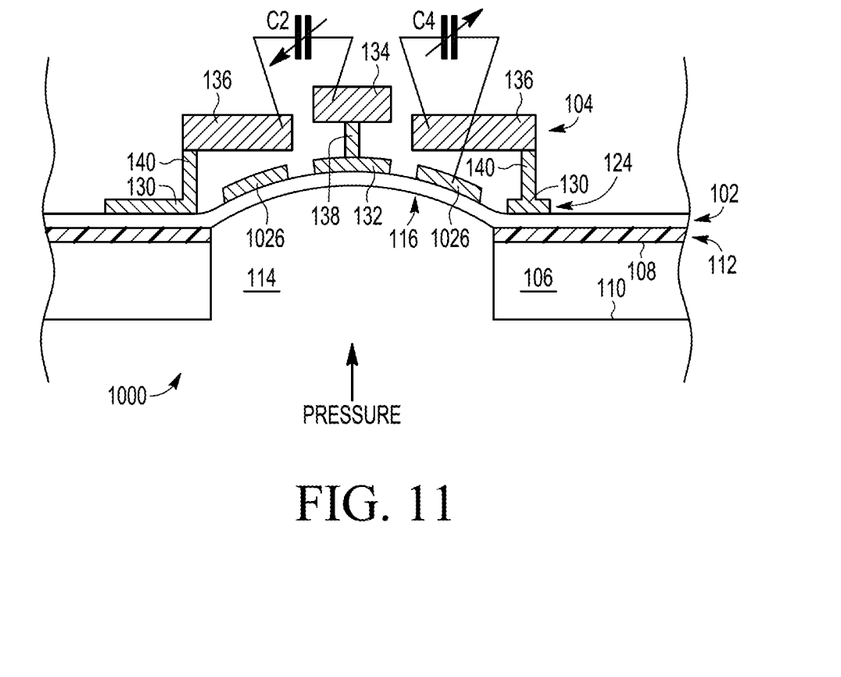
FIG. 11 is a cross-sectional view of the differential capacitive output pressure sensor device of FIG. 10 during operation in accordance with one embodiment.

FIG. 10 is a cross-sectional view of differential capacitive output pressure sensor device 1000 in accordance with another embodiment. FIG. 11 is a cross-sectional view of differential capacitive output pressure sensor device 1000 of FIG. 10 during operation in accordance with one embodiment. Differential capacitive output pressure sensor device 1000 of FIGS. 10 and 11 is similar to capacitive pressure sensor device 800 of FIGS. 8 and 9 with the primary exception being that differential capacitive output pressure sensor device 1000 includes a movable electrode 1026 on pressure sensor diaphragm portion 116 and provides a differential capacitive output.

As described above in reference to FIGS. 8 and 9, as the pressure increases, the capacitance between movable element 134 and fixed elements 136 is reduced from first capacitance C1 to second capacitance C2.

Further, a third capacitance C3 exists between movable electrode 1026 and fixed elements 136 as illustrated in FIG. 10. As the pressure increases, pressure sensor diaphragm portion 116 moves towards fixed elements 136 as illustrated in FIG. 11. This, in turn, decreases the spacing between movable electrode 1026 and fixed elements 136 thus increasing the capacitance between movable electrode 1026 and fixed elements 136 to a fourth capacitance C4.

Accordingly, as the pressure changes, a differential capacitive output is provided. More particularly, as the pressure increases, a first decreasing capacitance change from first capacitance C1 to a second capacitance C2 occurs and a second increasing capacitance change from the third capacitance C3 to the fourth capacitance C4 occurs. The differential capacitive output has improved linearity with respect to the pressure change and increased sensitivity allowing the change in pressure to be measured readily and accurately.

As described above, electrode layer 124 is patterned on pressure sensing diaphragm portion 116 into segregated conductors 126, 1026. Using these segregated conductors 126, 1026 and a connection to device layer 104, it is possible to form a pressure transducer with two sense capacitors in different configurations.

Figure 12:
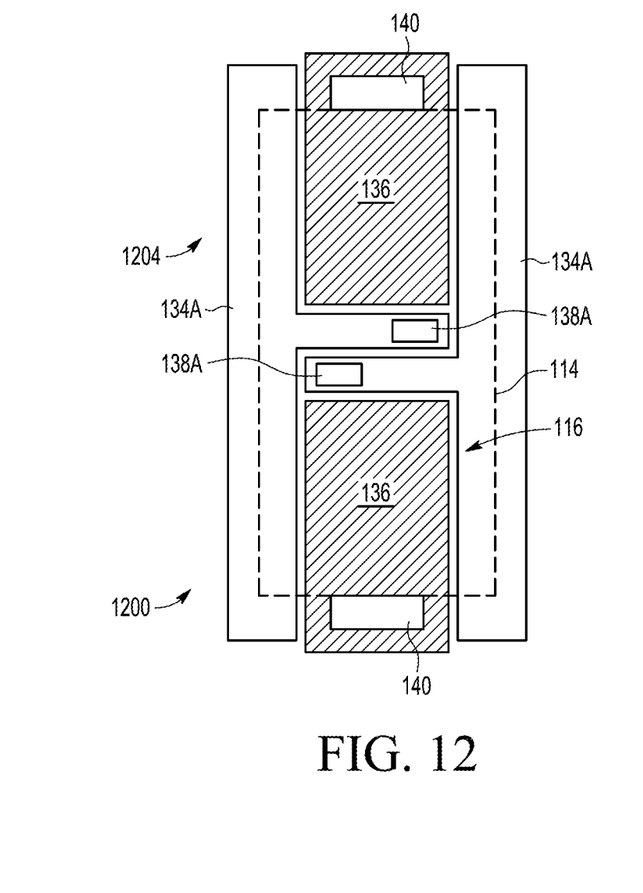
FIG. 12 is a top plan view of a device layer of a capacitive pressure sensor device in accordance with another embodiment.
Figure 13:
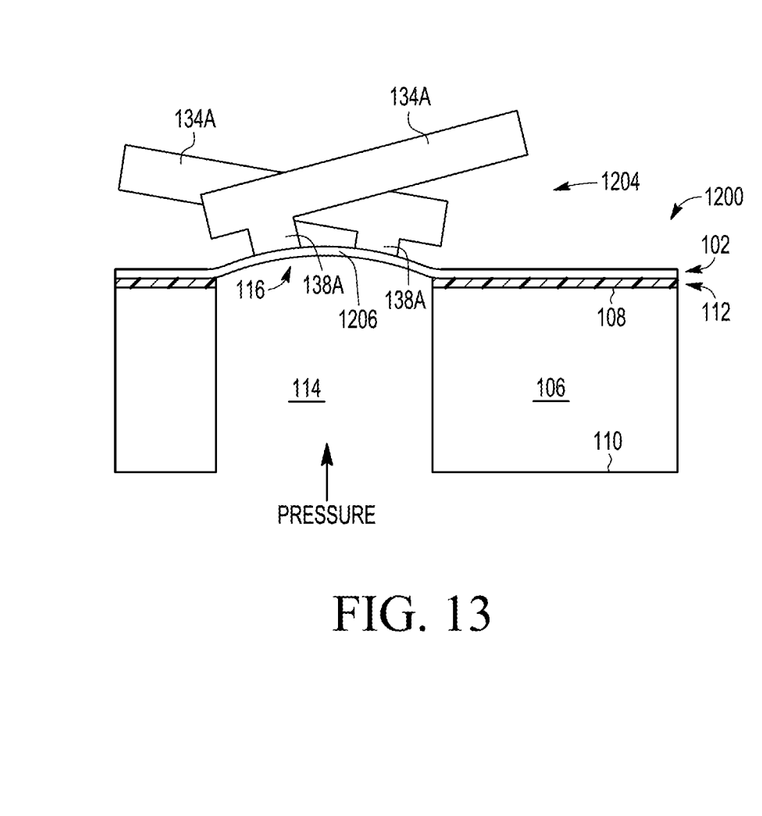
FIG. 13 is a side plan view of the capacitive pressure sensor device of FIG. 12 in accordance with one embodiment.

FIG. 12 is a top plan view of a device layer 1204 of a capacitive pressure sensor device 1200 in accordance with another embodiment. FIG. 13 is a side plan view of capacitive pressure sensor device 1200 of FIG. 12 in accordance with one embodiment. Capacitive pressure sensor device 1200 of FIGS. 12 and 13 is similar to differential capacitive output pressure sensor device 100 of FIGS. 1 through 7 and only the significant differences are illustrated and discussed below.

Referring now to FIGS. 12 and 13 together, in accordance with this embodiment, movable elements 134A are physically and electrically connected to pressure sensor diaphragm portion 116 by movable element vias 138A. Movable element vias 138A are connected to pressure sensor diaphragm portion 116, e.g., traces 132 thereon. More particularly, movable element vias 138A are offset from the apex 1206 (center) of pressure sensor diaphragm portion 116. Accordingly, as pressure sensor diaphragm portion 116 deforms due to pressure, movable elements 134A tilt relative to a plane parallel to upper surface 108 of substrate 106 and relative to one another. This increases the change in spacing and thus capacitance between movable elements 134A and/or the other capacitive electrodes. Examples of the other capacitive electrodes include fixed electrode 128, fixed elements 136, and movable electrode 1026 as described above. In this manner, sensitivity of capacitive pressure sensor device 1200 is enhanced.

Figure 14:
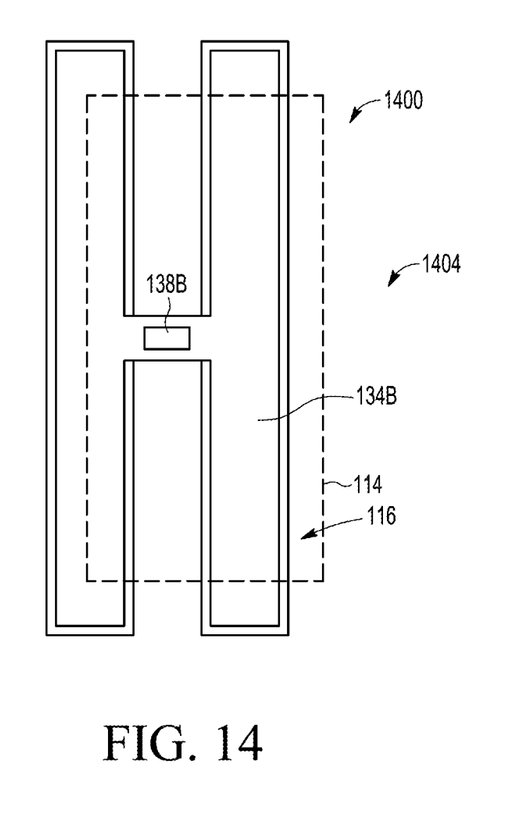
FIG. 14 is a top plan view of a device layer of a capacitive pressure sensor device in accordance with another embodiment.
Figure 15:
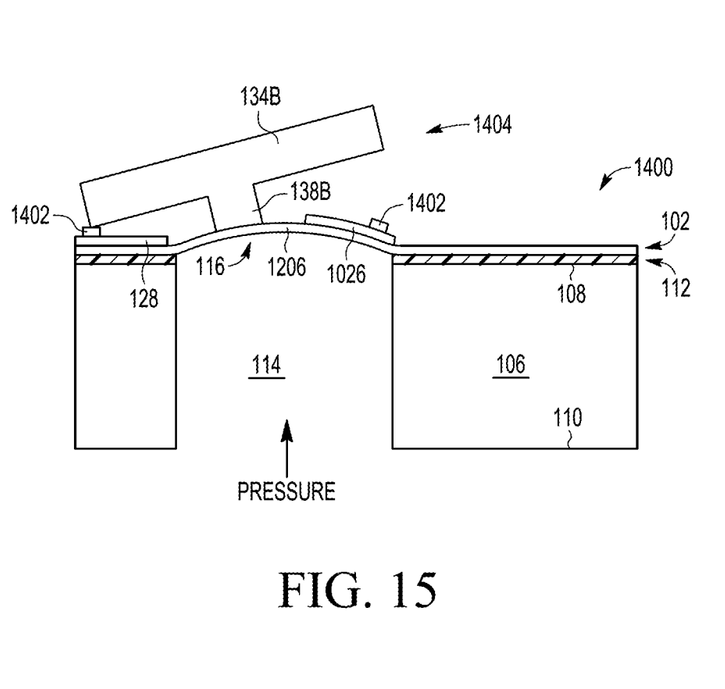
FIG. 15 is a side plan view of the capacitive pressure sensor device of FIG. 14 in accordance with one embodiment.

FIG. 14 is a top plan view of a device layer 1404 of a capacitive pressure sensor device 1400 in accordance with another embodiment. FIG. 15 is a side plan view of capacitive pressure sensor device 1400 of FIG. 14 in accordance with one embodiment. Capacitive pressure sensor device 1400 of FIGS. 14 and 15 is similar to differential capacitive output pressure sensor device 100 of FIGS. 1 through 7 and only the significant differences are illustrated and discussed below.

Referring now to FIGS. 14 and 15 together, in accordance with this embodiment, a movable element 134B is physically and electrically connected to pressure sensor diaphragm portion 116 by a movable element via 138B. Movable element via 138B is connected to pressure sensor diaphragm portion 116, e.g., traces 132 thereon, at a position offset from apex 1206 (center) of pressure sensor diaphragm portion 116. Accordingly, as pressure sensor diaphragm portion 116 deforms due to pressure, movable element 134B rocks, sometimes called tilts, relative to a plane parallel to upper surface 108 of substrate 106. This increases the change in spacing and thus capacitance between movable element 134B and the other capacitive electrodes. Examples of the other capacitive electrodes include fixed electrode 128, fixed elements 136, and movable electrode 1026 as described above. Fixed electrode 128 and movable electrode 1026 are illustrated in FIG. 15 as an example. Due to the increased displacement associated with the rocking of movable element 134B, sensitivity of capacitive pressure sensor device 1400 is enhanced.

In one embodiment, to avoid inadvertent contact and shorting between movable element 134B and the other electrodes, dielectric dimples 1402 are provided on the other electrodes. For example, dielectric dimples 1402 are provided over nitride islands, e.g., patterned portions of second dielectric layer 122 as discussed above in reference to FIG. 5. Accordingly, movable element 134B contacts dielectric dimples 1402 instead of the underlying electrode thus preventing shorting.

Figure 16:
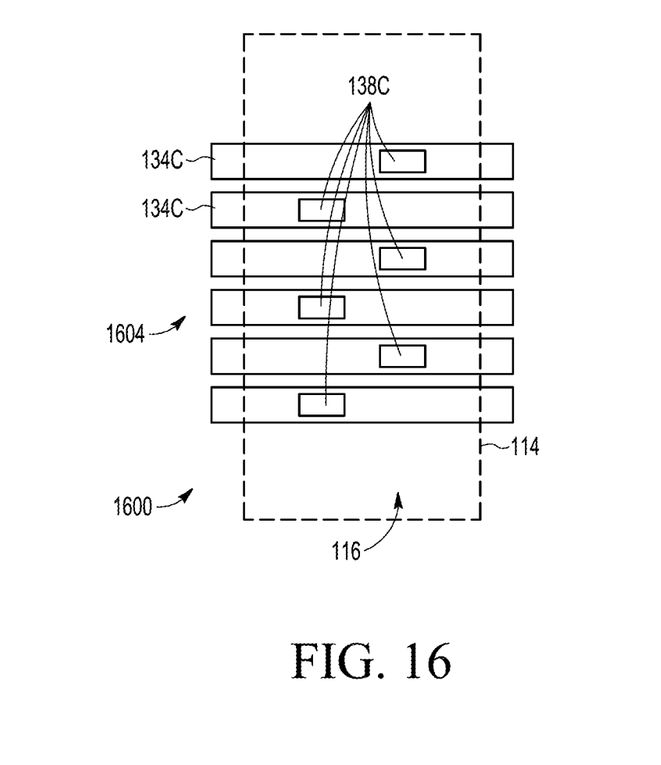
FIG. 16 is a top plan view of a device layer of a capacitive pressure sensor device in accordance with another embodiment.
Figure 17:
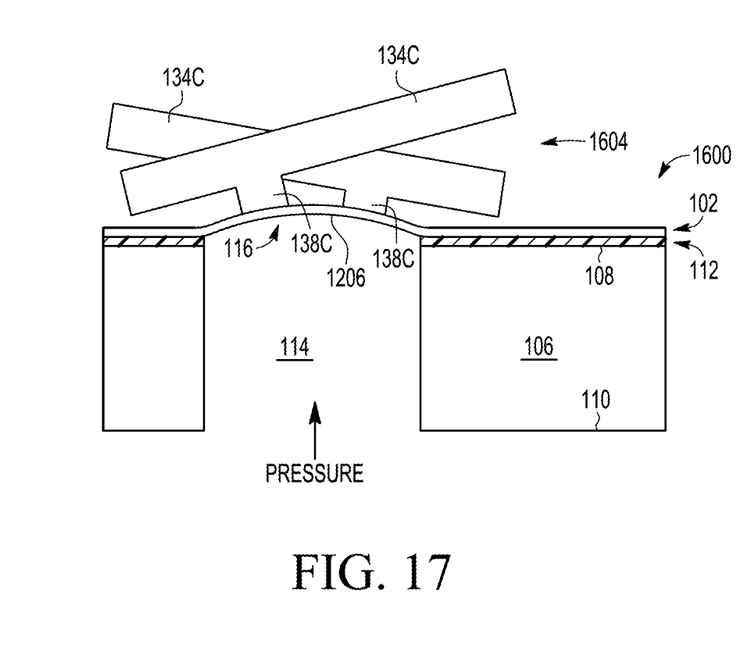
FIG. 17 is a side plan view of the capacitive pressure sensor device of FIG. 16 in accordance with one embodiment.

FIG. 16 is a top plan view of a device layer 1604 of a capacitive pressure sensor device 1600 in accordance with another embodiment. FIG. 17 is a side plan view of capacitive pressure sensor device 1600 of FIG. 16 in accordance with one embodiment. Capacitive pressure sensor device 1600 of FIGS. 16 and 17 is similar to differential capacitive output pressure sensor device 100 of FIGS. 1 through 7 and only the significant differences are illustrated and discussed below.

Referring now to FIGS. 16 and 17 together, in accordance with this embodiment, movable elements 134C are physically and electrically connected to pressure sensor diaphragm portion 116 by movable element vias 138C. Adjacent movable element vias 138C are connected to pressure sensor diaphragm portion 116, e.g., traces 132 thereon, in an alternating repeating pattern and offset from apex 1206. Accordingly, as pressure sensor diaphragm portion 116 deforms due to pressure, movable elements 134C tilt relative to a plane parallel to upper surface 108 of substrate 106 and relative to one another. This changes the overlap between movable elements 134C and thus the capacitance between movable elements 134C and/or the other capacitive electrodes.

Figure 18:
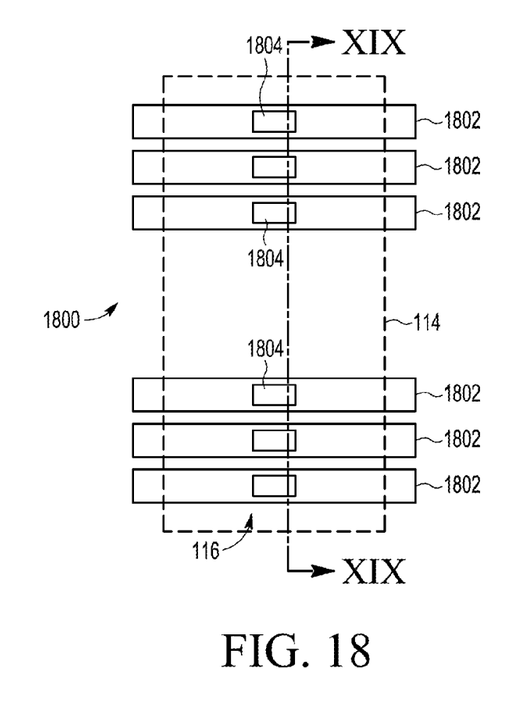
FIG. 18 is a top plan view of a device layer of a capacitive pressure sensor device in accordance with another embodiment.
Figure 19:
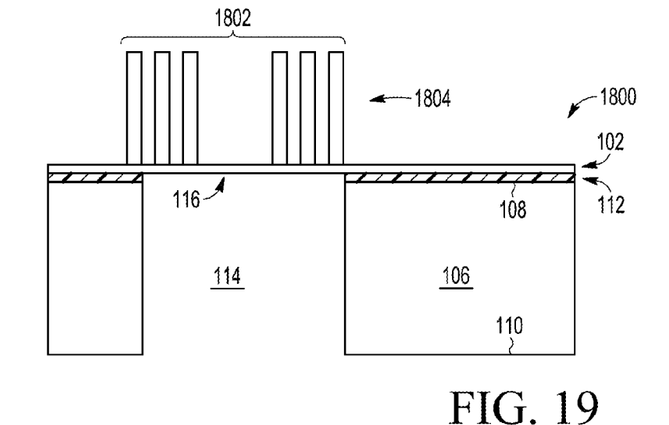
FIG. 19 is a cross-sectional view of the capacitive pressure sensor device of FIG. 18 along the line XIX-XIX in accordance with one embodiment.
Figure 20:
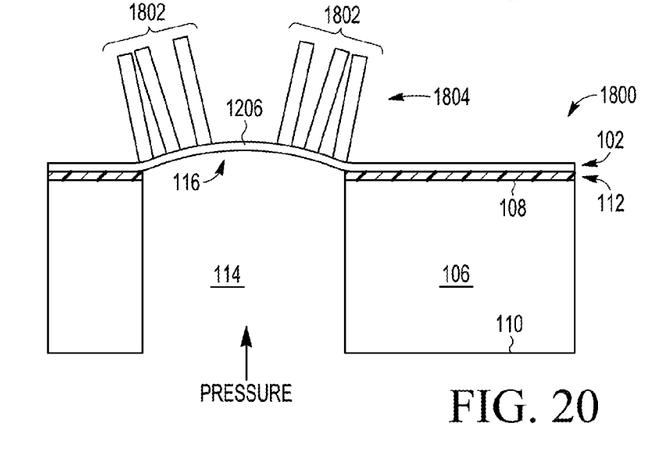
FIG. 20 is a cross-sectional view of the capacitive pressure sensor device of FIG. 18 along the line XIX-XIX during operation in accordance with one embodiment.

FIG. 18 is a top plan view of a device layer 1804 of a capacitive pressure sensor device 1800 in accordance with another embodiment. FIG. 19 is a cross-sectional view of capacitive pressure sensor device 1800 of FIG. 18 along the line XIX-XIX in accordance with one embodiment. FIG. 20 is a cross-sectional view of capacitive pressure sensor device 1800 of FIG. 18 along the line XIX-XIX during operation in accordance with one embodiment. Capacitive pressure sensor device 1800 of FIGS. 18-20 is similar to differential capacitive output pressure sensor device 100 of FIGS. 1 through 7 and only the significant differences are illustrated and discussed below.

Capacitive pressure sensor device 1800 includes tilting vertical plates 1802 connected to pressure sensing diaphragm portion 116, e.g., traces 132 thereon, by plate vias 1804. As pressure sensor diaphragm portion 116 deforms due to pressure, tilting vertical plates 1802, sometimes called movable elements 1802, tilt relative to one another. This increases and/or decreases the spacing and thus capacitance between tilting vertical plates 1802.

In one embodiment, the spacing of all of the tilting vertical plates 1802 either increases or decreases as the pressure changes. However, the tilting vertical plates 1802 can be connected such some of the capacitances increase while some of the capacitances decrease using appropriate routing and/or circuits.

In another embodiment, the tilting vertical plates 1802 directly adjacent the edges of pressure sensing diaphragm portion 116 move less than the tilting vertical plates more centered within pressure sensing diaphragm portion 116 due to the larger displacement of pressure sensing diaphragm portion 116 at the center. Accordingly, the more central tilting vertical plates 1802 spread apart whereas the more edge tilting vertical plates 1802 move closer together. Accordingly, the more central tilting vertical plates 1802 have decreased capacitance whereas the more edge tilting vertical plates 1802 have increased capacitance.

Figure 21:
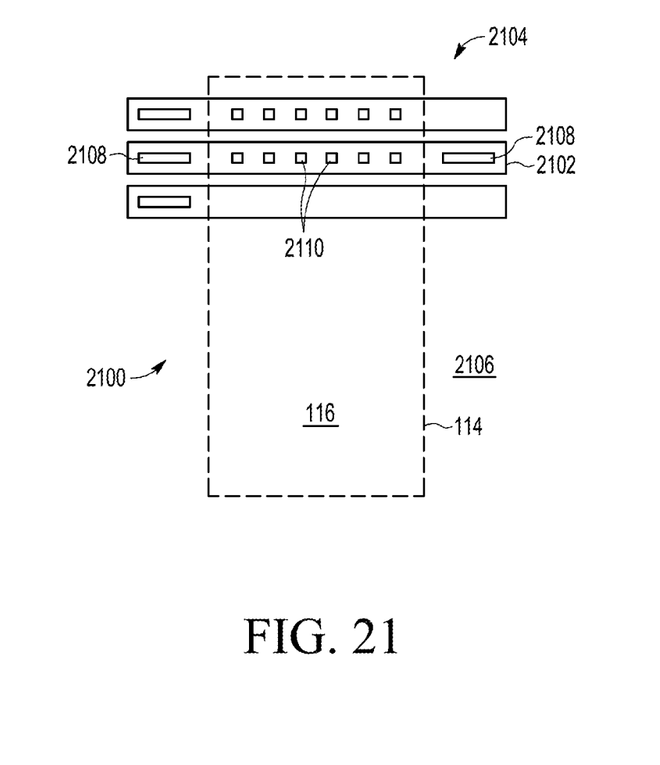
FIG. 21 is a top plan view of a device layer of a capacitive pressure sensor device in accordance with another embodiment.
Figure 22:
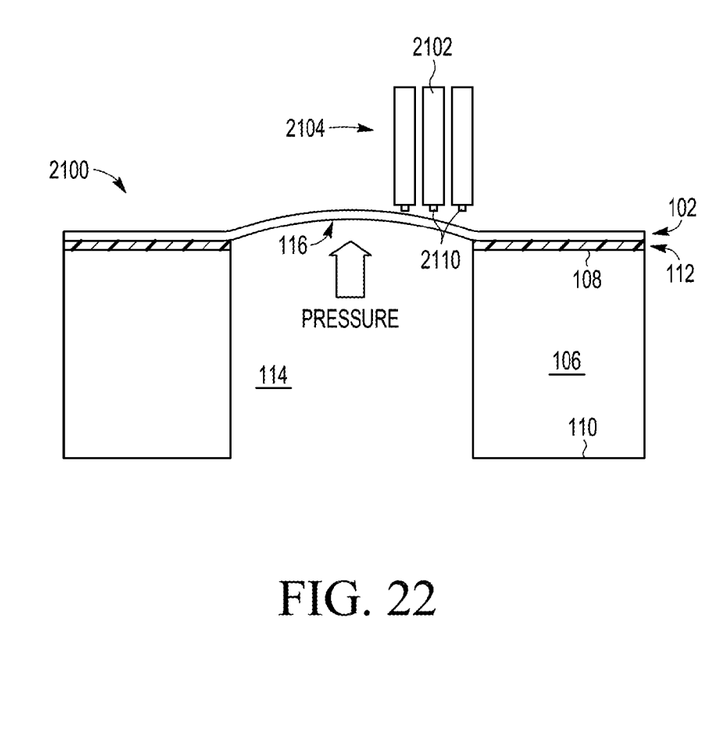
FIG. 22 is a side plan view of the capacitive pressure sensor device of FIG. 21 in accordance with one embodiment.

FIG. 21 is a top plan view of a device layer 2104 of a capacitive pressure sensor device 2100 in accordance with another embodiment. FIG. 22 is a side plan view of capacitive pressure sensor device 2100 of FIG. 21 in accordance with one embodiment. Capacitive pressure sensor device 2100 of FIGS. 21 and 22 is similar to differential capacitive output pressure sensor device 100 of FIGS. 1 through 7 and only the significant differences are illustrated and discussed below.

Referring now to FIGS. 21 and 22 together, one or more fixed elements 2102 are physically connected to a stationary portion 2106 of pressure sensor diaphragm layer 102 by anchors 2108, sometimes called vias. Stationary portion 2106 is outside of pressure sensing diaphragm portion 116, which moves. Fixed elements 2102 extend above and across pressure sensing diaphragm portion 116.

During operation, fixed elements 2102 act as travel stops for pressure sensing diaphragm portion 116. Accordingly, pressure sensing diaphragm portion 116 moves as the pressure changes until pressure sensing diaphragm portion 116 contacts fixed elements 2102. In this manner, fixed elements 2102 prevent over-travel of pressure sensing diaphragm portion 116 and/or improve linearity.

In one embodiment, to avoid inadvertent contact and shorting between fixed elements 2102 and pressure sensing diaphragm portion 116, dielectric dimples 2110 are provided on fixed elements 2102. Further, nitride islands can also be provided to prevent shorting. Accordingly, dielectric dimples 2110 and/or nitride islands are located between fixed elements 2102 and pressure sensing diaphragm portion 116 thus preventing shorting.

Although the invention is described herein with references to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A differential capacitive output pressure sensor device comprising:
   a pressure sensor diaphragm layer comprising:
      a pressure sensing diaphragm portion comprising a movable electrode,
      a device layer electrode,
      an electrically conductive shield plane layer,
      a first dielectric layer,
      a second dielectric layer, and
      an electrode layer; and
   a device layer comprising:
      a fixed element coupled to the device layer electrode; and
      a movable element coupled to the movable electrode.

2. The differential capacitive output pressure sensor device of claim 1 further comprising:
   a movable element via physically and electrically connecting the movable element with the movable electrode; and
   a fixed element via physically and electrically connecting the fixed element with the device layer electrode.

3. The differential capacitive output pressure sensor device of claim 1 wherein the movable element is movable relative to the fixed element.

4. The differential capacitive output pressure sensor device of claim 1 wherein the pressure sensor diaphragm layer further comprises a fixed electrode.

5. The differential capacitive output pressure sensor device of claim 4 wherein the movable electrode is movable relative to the fixed element and the movable element is movable relative to the fixed electrode, the movable electrode and the movable element being configured to move together.

6. The differential capacitive output pressure sensor device of claim 5 wherein a capacitance between the movable electrode and the fixed element is configured to increase as a capacitance between the movable element and the fixed electrode is configured to decrease.

7. The differential capacitive output pressure sensor device of claim 5 wherein a capacitance between the movable electrode and the fixed element is configured to decrease as a capacitance between the movable element and the fixed electrode is configured to increase.

8. The differential capacitive output pressure sensor device of claim 1 further comprising:
   a substrate comprising a pressure sensor port extending to the pressure sensing diaphragm portion.

9. The differential capacitive output pressure sensor device of claim 1 wherein the electrode layer comprises the movable electrode and the device layer electrode.

10. The differential capacitive output pressure sensor device of claim 1 wherein the electrode layer comprises electrically conductive polysilicon.

11. The differential capacitive output pressure sensor device of claim 1 wherein the device layer comprises single crystal silicon.

12. The differential capacitive output pressure sensor device of claim 1 further comprising a capping layer defining a cavity, the fixed element and the movable element being within the cavity.

13. A method comprising:
   forming a pressure sensing diaphragm layer comprising
      an electrically conductive shield plane layer,
      a first dielectric layer,
      a second dielectric layer, and
      an electrode layer, the electrode layer comprising a movable electrode on a pressure sensing diaphragm portion of the pressure sensing diaphragm layer, a fixed electrode, and a device layer electrode;
   forming a movable element and fixed element in a device layer;
   coupling the movable element to the movable electrode and the fixed element to the device layer electrode, the movable element being configured to move relative to the fixed element.

14. The method of claim 13 further comprising measuring a pressure comprising:

measuring a capacitance between the movable electrode and the fixed element; and measuring a capacitance between the fixed electrode and the movable element.

15. The method of claim 13 wherein the coupling comprises:

physically and electrically connecting the movable element with the movable electrode with a movable element via; and physically and electrically connecting the fixed element with the device layer electrode with a fixed element via.

* * * * *